United States Patent [19]

Nishimura et al.

[11] Patent Number: 5,195,003
[45] Date of Patent: Mar. 16, 1993

[54] MAGNETIC HEAD DEVICE INCLUDING CROSSTALK PREVENTION CIRCUIT

[75] Inventors: Masaru Nishimura, Hyogo; Yasuhide Kasagi; Naoto Sugawara, both of Fukushima, all of Japan

[73] Assignee: Mitsubishi Denki Kabushiki Kaisha, Japan

[21] Appl. No.: 629,422

[22] Filed: Dec. 18, 1990

[30] Foreign Application Priority Data

Dec. 18, 1989 [JP] Japan .................................. 1-327696
Feb. 23, 1990 [JP] Japan .................................. 2-41211

[51] Int. Cl.$^5$ .............................................. G11B 5/17
[52] U.S. Cl. .................................................... 360/124
[58] Field of Search ............................ 360/124, 121

[56] References Cited

U.S. PATENT DOCUMENTS 3,683,515 8/1972 Kosaka .......................... 360/124 X

FOREIGN PATENT DOCUMENTS 61-224106 10/1986 Japan .
63-157802 10/1988 Japan .

Primary Examiner—A. J. Heinz
Attorney, Agent, or Firm—Wolf, Greenfield & Sacks

[57] ABSTRACT

Crosstalk prevention means or short-circuit means is connected in parallel to an erasing coil for erasing part of data prior to recording the data by a read/write coil, whereby a cancelling magnetic flux for erasing a crosstalk magnetic flux is generated to improved an S/N ratio.

13 Claims, 12 Drawing Sheets

MAGNETIC HEAD DEVICE INCLUDING CROSSTALK PREVENTION CIRCUIT

BACKGROUND OF THE INVENTION

1. Field of the Invention

The present invention relates to a magnetic disk device such as a floppy disk drive (FDD) device for example, and more specifically to a magnetic head device equipped with a magnetic head for preventing any crosstalk from being caused, said magnetic head having a plurality of coils which form a corresponding plurality of provided corresponding gaps.

2. Description of the Prior Art

FIGS. 5 and 6 are side and front views illustrating a prior art magnetic head of the tunnel erasing type. In the same figures, numeral (1) designates an L-shaped read/write core which has a slidable surface (1a), (2) designates a first center core which has a slidable surface (2a) coincident with the slidable surface (1a) of the read/write core and forms a read/write gap (3), having a predetermined length, at the center of a junction between the slidable surfaces (1a), (2a). Numeral (4) designates a non-magnetic glass filler which specifies the length of the read/write gap (3) and joins the read core (1) with the first center core (2), and numeral (5) designates a first back bar connected to both ends of the read/write core (1) and the first center core (2) for forming a magnetic circuit closed by both cores (1), (2). Numeral (6) designates a read/write coil wound around the read/write core (1) and having input and output terminals (6a), (6b) for signals. Numeral (7) designates an L-shaped erasing core having a slidable surface (7a), and (8) designates a second center core having a slidable surface (8a) coincident with the slidable surface (7a) of the L-shaped erasing core and further having an erasing gap (9) formed between opposite ends of a connection portion between the slidable surfaces (7a) and (8a), in which a distance between the erasing gaps (9), (9) is slightly less than the length of the read/write gap (3). Numeral (10) is a non-magnetic filler for defining the length of the erasing gap (9), said non-magnetic filler comprises a glass agent for joining the erasing core (7) and the second center core (8). Numeral (11) is a second back bar connected to both ends of the erasing core (7) and the second center core (8) to form a magnetic circuit closed by both cores (7), (8). Numeral (12) is an erasing coil wound around the erasing core (7) and having input and output terminals (12a), (12b) through which a predetermined current is permitted to flow upon recording a signal. Numeral (13) is a non-magnetic center separator connected between the back surfaces of the first and second center cores (2), (8) and between the first and second back bars (5), (11).

The operation of the prior art magnetic head constructed as such will now be described where data is recorded and regenerated on a magnetic medium such as a floppy disk and the like. Recording of data on a recording medium will first be described. A signal corresponding to data to be recorded is applied to the input and output terminals (6a), (6b) of the read/write coil (6), and predetermined voltage is applied to the input and output terminals (12a), (12b) of the erasing coil (12). The read/write gap (3) slides on the recording surface of the recording medium ahead of the erasing gap (9). Accordingly, as illustrated in FIG. 7, a current flowing through the read/write coil (6) based upon the signal causes a magnetic field to appear in the read/write gap (3) which in turn overwrites new data on previous data (14) on the recording medium. Thus, data (15a) corresponding to the aforementioned signal is written on the recording medium. Additionally, a predetermined current has been driven to flow through the erasing coil (12), so that a predetermined magnetic flux correspondingly appears in the erasing gap (9) to erase opposite end data of the new data (15a) recorded by the read/write gap (3) and hence allow write data (15) with guard bands (16) at the opposite ends to be written on the recording medium. Alternately, when the write data (15) is regenerated (read), once the magnetic head is forced to slide on the recording surface of the recording medium without permitting a current to flow to the erasing coil (12), a magnetic flux change appears over the read/write gap (3) in response to the write data (15) to permit a current to flow through the read/write coil (6). Thus, regenerated output voltage appears at the input and output terminals (6a), (6b) of the read/write coil (6) for its regeneration.

Additionally, a magnetic head of a preceding erasing type different from the above tunneling erasing type in the conventional example 1 is also described in Japanese Patent Laid-Open No. 61-39910 for example. Referring to FIGS. 8 and 9, the magnetic head of the preceding erasing type is illustrated as a conventional example 2. The present example is different from the conventional example 1 chiefly in view of the fact that a position where the erasing gap (9) in the example 2 is formed as different from the example 1 between the both examples. Namely, the erasing gap (9) is formed at the center of a junction between the slidable surfaces (7a), (8a) of the erasing core (7) and the second center core (8) so as to be longer than the length of read/write gap (3).

In the following, there will be described cases where the magnetic head of the preceding erasing type constructed as described above is used to record and regenerate data on and from a magnetic medium such as a floppy disk. First, there will be described the case where data is recorded on a recording medium. A signal corresponding to data to be recorded is applied to the input and output terminals (6a), (6b) of the read/write coil (6) while predetermined voltage is applied to the input and output terminals (12a), (12b) of the erasing coil (12). The erasing gap (9) slides on the recording surface of the recording medium preceding the read/write gap (3). Accordingly, as illustrated in FIG. 10, a predetermined current is allowed to flow through the erasing coil (12) and hence a predetermined magnetic flux is allowed to appear across the erasing gap (9) to erase the previous data (14) on the recording medium. Additionally, a current flowing through the read/write coil (6) based on the signal causes a magnetic flux to appear across the read/write gap (3) to record new data of the recording medium on a portion where the previous data (14) has been erased by the erasing gap (9), and hereby the write data (15) having guard bands (16) on opposite ends of the new data on the same will be written.

Alternatively, when the write data (15) is regenerated (read out), as the magnetic head is forced to slide on the recording surface of the recording medium without driving a current through the erasing coil (12) as illustrated in FIG. 11, a magnetic flux change in response to the write data (15) appears across the read/write gap (3) to drive a current through the read/write coil (6). Hereby, regenerated output voltage in response to the write data (15) appears across the input and output terminals (6a), (6b) of the read/write coil (6) for regeneration.

Additionally, there is also disclosed a prior example 3 illustrated in FIGS. 12 and 13 as another version of the magnetic head of the preceding type. The prior example 3 is intended to be more miniaturized than the prior example 2 by elimination of the center separator (13). Additionally, the first and second center cores (2), (8) are united into a single center core (17) and the first and second back bars (5), (11) are united into a single back bar (18).

The above-described magnetic head is also operable in the same manner as in the prior example 2 illustrated in FIGS. 8 and 9 in the case where any data is recorded and regenerated on and from the magnetic medium.

Now, in the magnetic head of the prior example 1 illustrated in FIGS. 5 and 6, an offset may sometimes be produced between a write data (15) track and a read/write gap (3) on the basis of causes such as eccentricity and so on when the write data (15) on the recording medium is regenerated. More specifically, a displacement may be produced between the read/write gap (3) and the writedata (15) and between the erasing gap (9) and the write data (15) as illustrated in FIG. 14, to result in the an offset (19) that is an overlapped portion between the erasing gap (8) and the write data (15). With the existence of such an offset (19), a magnetic flux is changed across the erasing gap (9) upon regeneration due to the write data (15) at the portion of the offset (19), and is circulated along a magnetic circuit composed of the erasing core (7), the second center core (8), and the second back bar (11) and is allowed to appear on a magnetic circuit composed of the first center core (2) and the first back bar (5) as a leakage magnetic flux. Hereby, the magnetic flux intersects the read/write coil (6) as a crosstalk magnetic flux for electromagnetic conversion. Accordingly, regenerated output voltage appearing on the input and output terminals (6a), (6b) of the read/write coil (6) is deteriorated in its S/N ratio.

Additionally, also in the magnetic head of the preceding erasing type illustrated in FIGS. 2 and 3, the erasing gap (9) is allowed to slide on the write data (15) upon regeneration of the write data (15) of the recording medium ahead of the read/write gap (13) as illustrated in FIG. 11, so that a magnetic flux is changed upon regeneration across the erasing gap (9) due to the write data (15), and is circulated through the magnetic circuit composed of the erasing core (7), the second center core (8), and the second back bar (11) and is allowed to appear on the magnetic circuit composed of the read/write core (1), the first center core (2), and the first back bar (5) as a leakage magnetic flux. Hereby, the magnetic flux intersects the read/write coil (6) as a crosstalk magnetic flux for electromagnetic conversion. Accordingly, regenerated output voltage appearing on the input and output terminals (6a), (6b) of the read/write coil (6) is deteriorated in its S/N ratio. The deteriorations of the S/N ratios are increased in the order of the conventional examples 1, 2, and 3.

There is disclosed a technique to prevent the deterioration of an S/N ratio caused by such a crosstalk magnetic flux produced due to the erasing gap (9) in Japanese Patent Laid-Open No. 61-148617 for example. Referring to FIGS. 15 and 16, prior example 4 is illustrated which includes a magnetic head disclosed in the above publication. In the figure, numeral (20) designates a short-circuit ring wound around the erasing core (7) which is disposed so as to induce a magnetic field in the opposite direction to an AC magnetic field induced on the erasing core (7) owing to the offset (19) upon regeneration.

In the magnetic head arranged as such any data is likewise recorded on and regenerated from a recording medium similarly to the prior example 1 illustrated in FIGS. 5 and 6. Additionally, even though where is produced any magnetic flux change across the erasing gap (9) upon regeneration owing to the write data (15), the short-circuit ring (20) operates to cancel out the magnetic flux change and hence restrict generation of a magnetic field along the magnetic circuit composed of the erasing core (7), the second center core (8), and the second back bar (11). There is therefore reduced the leakage magnetic flux that appears along the magnetic circuit composed of the read/write core (1), the first center core (2), and the first back bar (5). Hereby, there is improved the S/N ratio of the regenerated output voltage appearing on the input and output terminals (6a), (6b) of the read/write coil (6).

Additionally, there is also disclosed a technique (not shown) in Japanese Patent Appication No. 61-194615 in which an additional core is provided to the erasing core or a transformation circuit is provided on the erasing coil.

There is further disclosed a technique to eliminate crosstalk produced along the read/write coil (6) due to resonance between inductance and stray capacity of the erasing coil (12) when a current to the erasing coil (12) as a factor of production of another type of the crosstalk is off in for example Japanese Utility Model Laid-Open No. 63-157802.

Referring to FIG. 17, there is illustrated a prior example 5 disclosed in the above reference. In the figure, numeral (21) designates a diode connected across the input/output terminals (12a), (12b) of the erasing coil (12) with its cathode connected to the input/output terminal (12a) to which a plus DC potential is applied and with its anode connected to the input/output terminal (12b) to which a minus DE potential (or ground) is applied.

In the magnetic head arranged as such, as data is recorded on and regenerated from the recording medium as in the same manner as the prior example 1. The diode (20) short-circuits a current which is to flow owing to electromagnetic energy stored on the erasing coil (12) when the current to the erasing coil (12) is off upon the completion of the recording, so that resource through stray capacitance is prevented without causing any crosstalk on the read/write coil (6).

Additionally, referring to FIG. 18, prior example 6 is illustrated, in which a resistor (22) is connected instead of the diode (21) and which exhibits the same effect as the prior example 5.

Further, Japanese Patent Application No. 60-93603 discloses another technique, although not shown, to deal with any noise which might be produced when the magnetic head has not been operated for recording and regeneration on and from the magnetic recording medium, in which a noise-induced magnetic field is prevented from being produced and hence any data already recorded is protected, by short-circuitting opposite ends of the head coil of the magnetic head.

However, in the magnetic head of the prior example 4 illustrated in FIGS. 15 and 16, although the short-circuit ring (20) was provided on the erasing core (7) to suppress the affection of crosstalk to the read/write coil (6), the crosstalk being caused by a change in a magnetic flux produced across the erasing gap (9) due to the write data (15), the technique complicated the magnetic head and hence increased the burden upon manufacture of the same because of the provision of the short-circuit ring (20) on the magnetic head itself.

Additionally, in the prior examples 5 and 6 described with reference to FIGS. 17 and 18, although they were satisfactory in suppressing crosstalk to the read/write coil (6) during the current-off to the erasing core (12), it regrettably failed to reduce crosstalk along the read/write coil (6) caused by a change in a magnetic flux produced across the erasing gap (9) upon regeneration of data recorded on a recording medium. Moreover, in the technique wherein the non-magnetic center separator was provided in the center core, although the erasing crosstalk caused by a magnetic flux detected by the erasing gap was reduced by the existence of the non-magnetic layer, regeneration efficiency of the read/write core was deteriorated corresponding to the provision of the non-magnetic layer in the center core, and hence the S/N ratio was lowered. Still more, pseudo-gap noise was caused by the existence of the non-magnetic layer itself to considerably lower the S/N ratio finally, and further the center core was complicated in its manufacture, resulting in lowered yield and correspondingly in the expensive cost of the manufacture.

SUMMARY OF THE INVENTION

In view of the drawbacks with the prior art, it is in object of the present invention to provide an inexpensive magnetic head device with a higher S/N ratio which is easy to manufacture and is capable of reducing crosstalk noise due to data recorded on a recording medium upon regeneration of the data.

A magnetic head device according to the present invention comprising a magnetic head having a plurality of gaps and a plurality of coils each provided corresponding to those gaps includes crosstalk prevention means connected parally to at least one among the coils of the magnetic head and having inductance, reactance, or capacitance, for preventing crosstalk.

Additionally, the magnetic head comprising a read/write core with a read/write coil wound therearound, an erasing core with an erasing coil wound therearound, and a center core which forms a read/write gap and an erasing gap between said cores includes erasing coil short-circuit means for short-circuitting upon signal regeneration ends of said erasing coil with a resistor of DC resistance less than that of the erasing coil.

In accordance with the present invention, the crosstalk prevention means generates a canceling magnetic flux directed oppositely to a crosstalk magnetic flux by electromotive force generated, on the basis of the crosstalk magnetic flux, on the input/output ends of the coil connected in parallel to the crosstalk prevention means, to suppress the crosstalk magnetic flux.

Furthermore, the erasing coil terminals are short-circuitted therebetween upon signal regeneration so that a current is produced along be erasing coil due to a magnetic flux existent in the erasing core to cancel the erasing crosstalk magnetic flux by self-induction thereof.

The above and other objects, features, and advantages of the invention will become more apparent from the following description when taken in conjunction with the accompanying drawings.

DETAILED DESCRIPTION OF THE DRAWINGS

DESCRIPTION OF THE PREFERRED EMBODIMENT

In the following, preferred embodiments of the present invention will be described with reference to the accompanying drawings. Herein, in the figures like symbols as those in the prior practices designate like or equivalent portions and hence overlapping description will be neglected.

Figure 1:
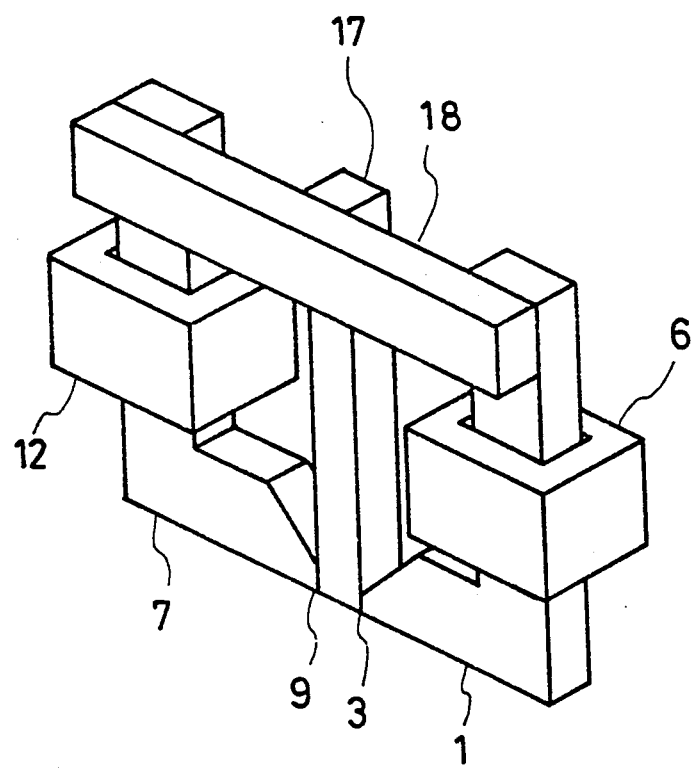
FIG. 1 is a perspective view illustrating a portion of a magnetic head device in an embodiment of the present intention.

FIG. 1 is a perspective view illustrating a portion of a magnetic head in an embodiment of the present invention, and FIG. 2 is a wiring diagram of a read/write coil and an erasing coil in a first embodiment of the present invention.

In the figures, numeral (22) is a resistor connected to the input/output ends (12a), (12b) of the erasing coil (12) for preventing any surge from occuring in an erasing current waveform upon given DC voltage being applied to the input/output ends (12a), (12b) to conduct the erasing current, and for conducting a current induced to flow by elelectromagnetic energy stored in the erasing coil (12) when the erasing current is siezed to flow to prevent resonance by stray capacitance of the erasing core (12) and hence preventing crosstalke from being produced along the read/write coil (6) upon the erasing current being off, the resistor (22) having resistance several times a resistance $R_2$ of the erasing coil (12). Numeral (23) is crosstalk prevention means composed of an inductance coil having an inductance component $L_4$ connected between the input/output ends (12d), (12b) of the erasing coil (12) for generating electromotive force as a cancelling magnetic flux opposite to the crosstalk magnetic flux, the electromotive force being generated intercrossing the erasing coil (12) erased on a change in a magnetic flux generated across the erasing gap (9) owing to the magnetic force of the write data (15). Additionaly, L1, C1, and R1 are an inductance component, a stray capacitance component, and a DC resistance component of the read/write coil (6), respectively, while L2, C2, and R2 are an inductance component, a stray capacitance component, and a DC resistance component of the erasing coil (12), respectively, and further R3 is a DC resistance component of the resistor (22).

Figure 2A:
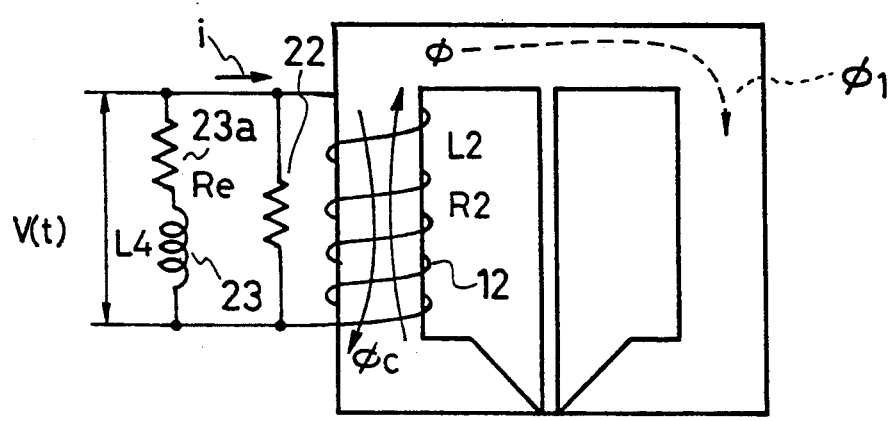
FIG. 2A is a circuit diagram of an embodiment of the present invention as applied to a magnetic head.
Figure 2B:
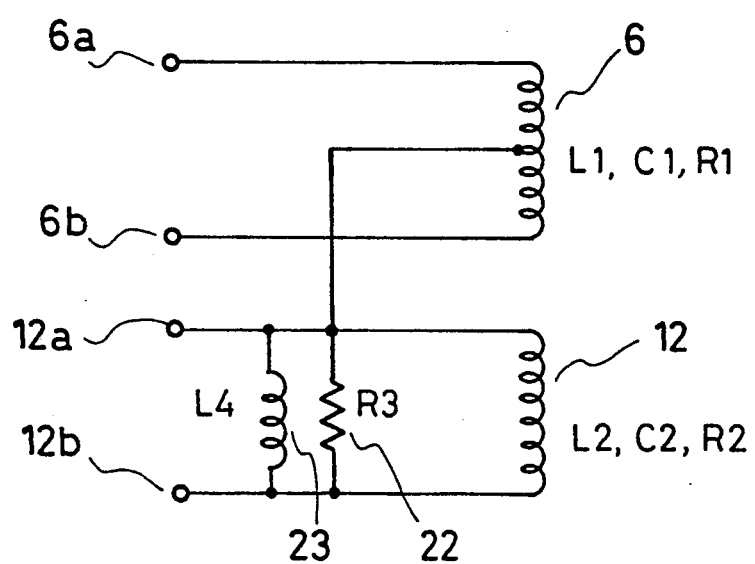
FIG. 2B is a schematic circuit diagram of the circuit of FIG. 2A.
Figure 5:
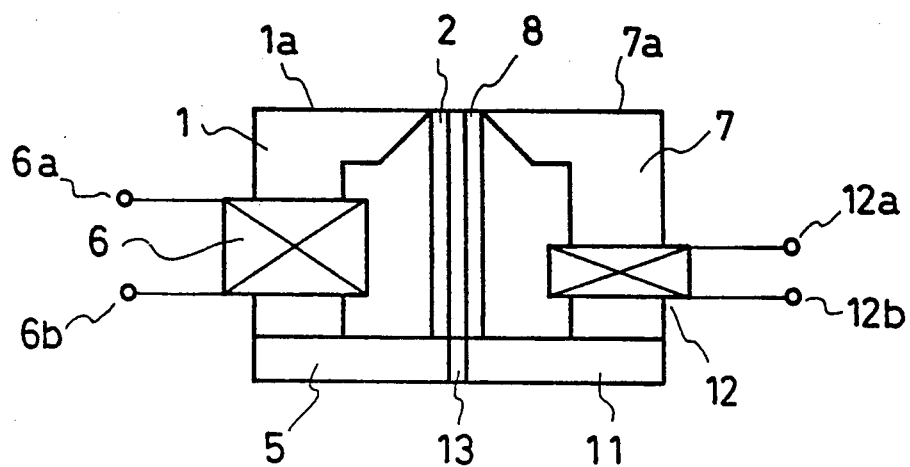
FIGS. 5 and 6 are side and front views each illustrating a magnetic head of a tunnel erasing type.
Figure 6:
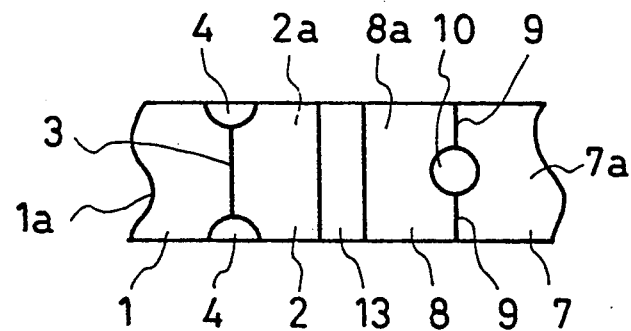
Figure 7:
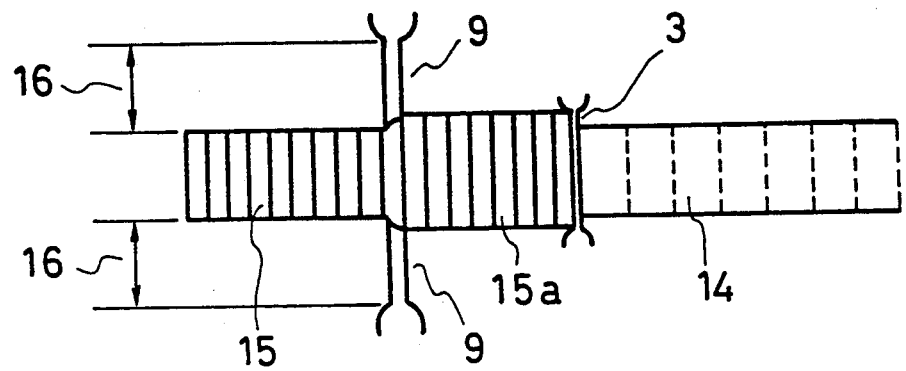
FIG. 7 is a view illustrating a relationship between the magnetic head and write data as recorded on a recording medium by the magnetic head.
Figure 8:
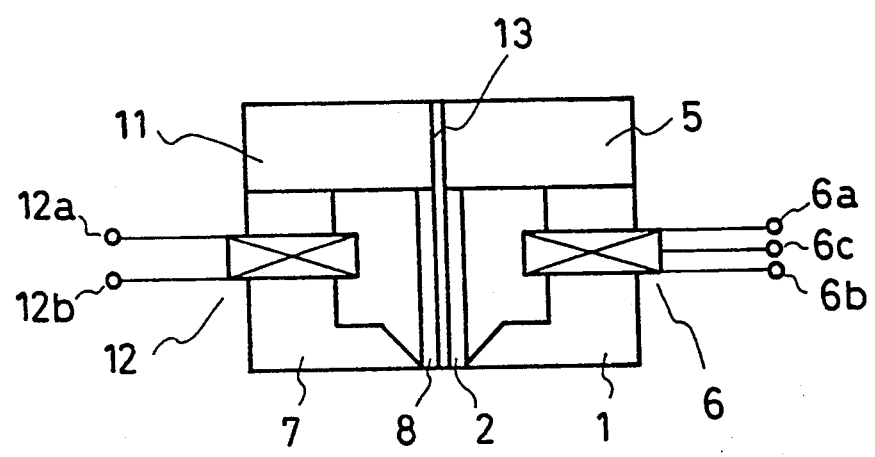
FIGS. 8 and 9 are side and front views each illustrating a magnet head of a preceding erasing type.
Figure 9:
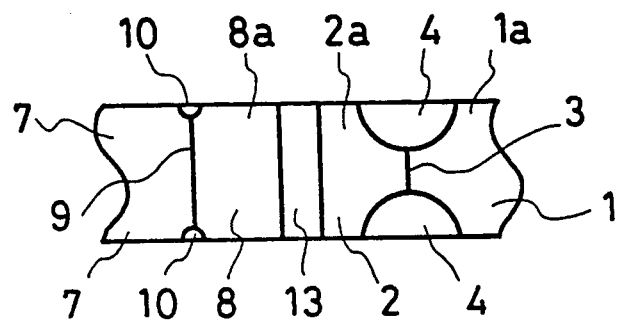
Figure 10:
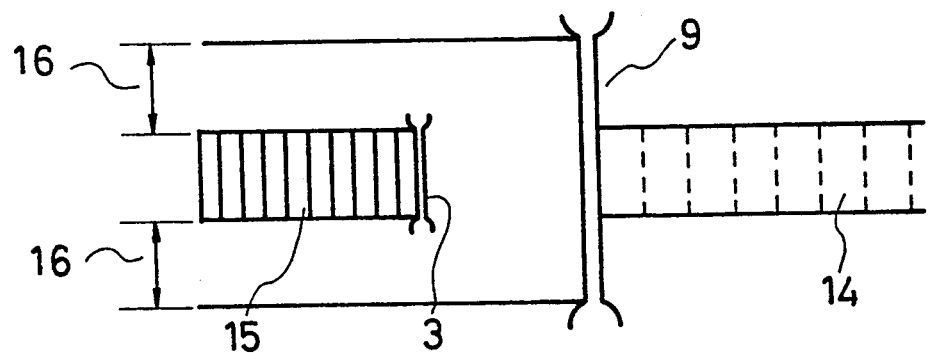
FIGS. 10 and 11 are views each illustrating a relationship between the magnetic head and write data as recorded on and regenerated from a recording medium by the magnetic head.
Figure 11:
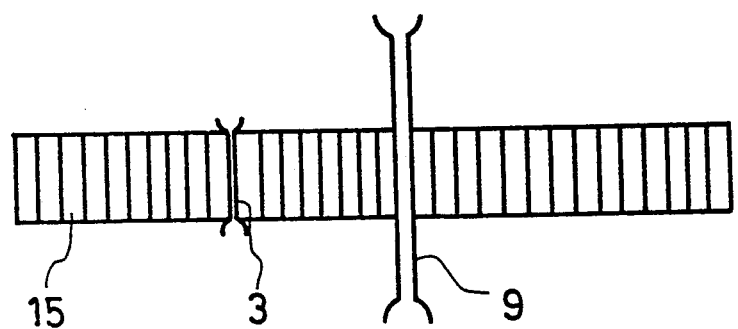
Figure 12:
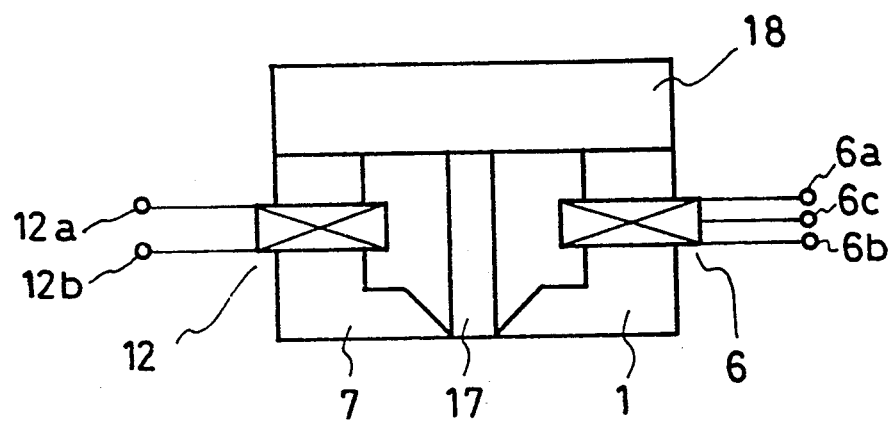
FIGS. 12 and 13 are side and front views each illustrating another magnetic head of the preceding erasing type.
Figure 13:
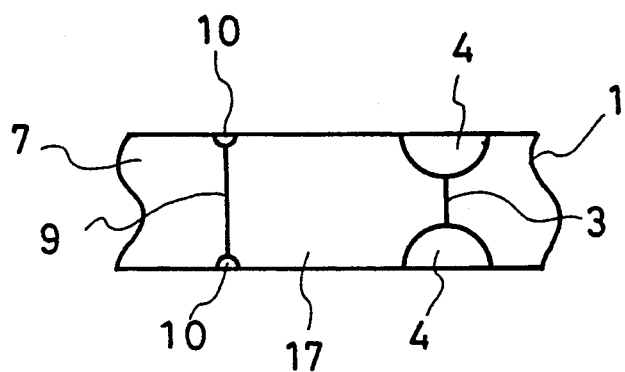
Figure 14:
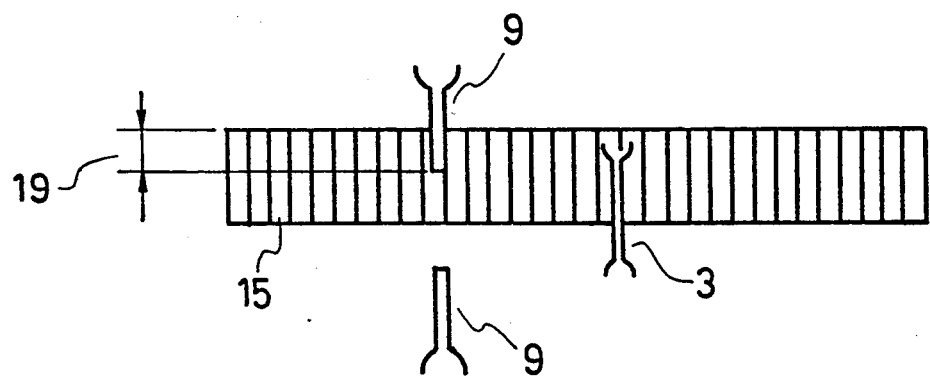
FIG. 14 is a view illustrating a relationship between the magnetic head of the foregoing tunnel erasing type and write data as recorded on a recording medium by the magnetic head and an offset is produced.
Figure 15:
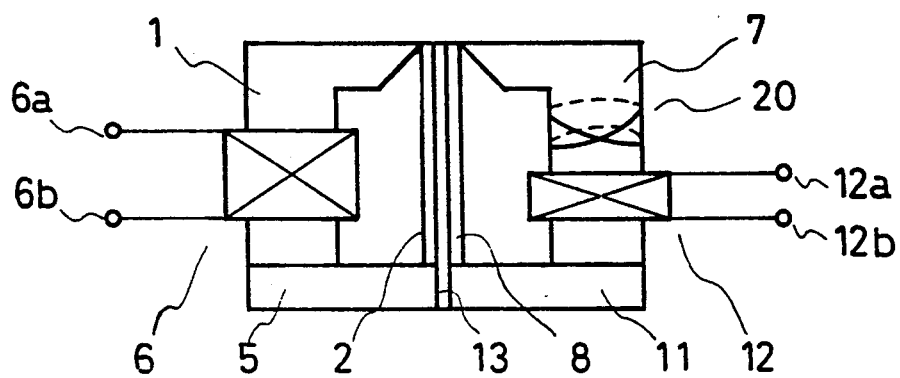
FIGS. 15 and 16 are side and front views each illustrating the magnetic head of the preceding erasing type with a short-circuit ring provided therein.
Figure 16:
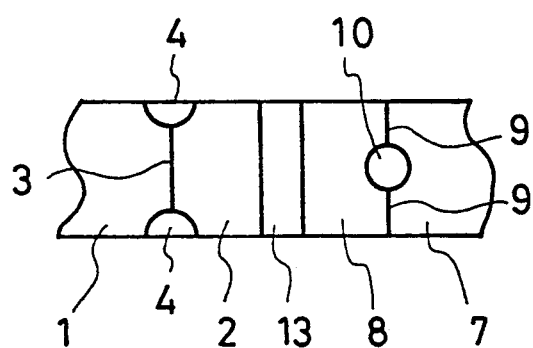
Figure 17:
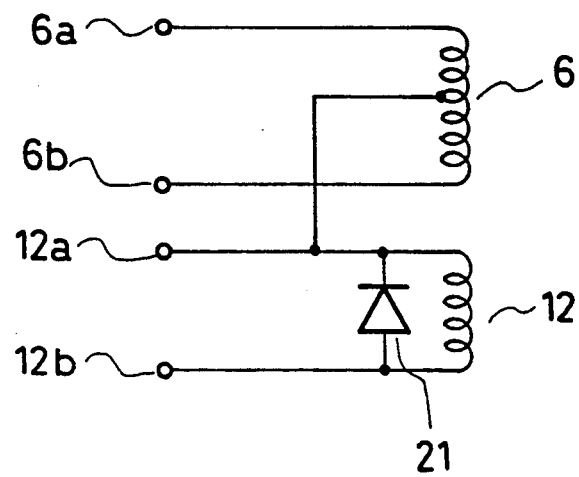
FIGS. 17 and 18 are views each illustrating a connection relationship between a prior read/write coil and a prior erasing coil.
Figure 18:
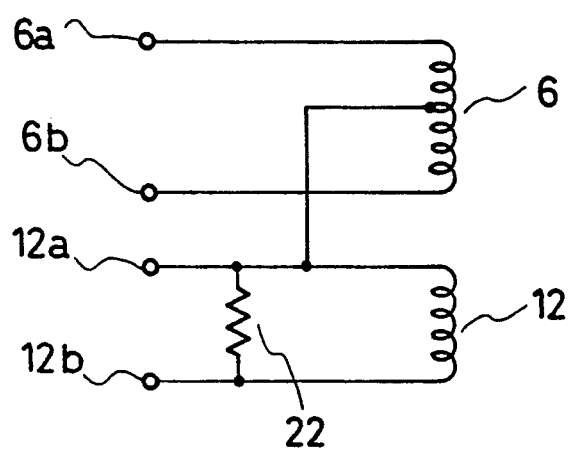

Additionally, the read/write coil (6) and the erasing coil (12) illustrated in FIGS. 2(a), (b) are ones used in the magnetic head of the tunnel erasing type described in the prior practice 1 (FIGS. 5 and 6) or in the magnetic head of the preceding described in the prior practice 2 (FIGS. 8 and 9) or in the prior practice 3 (FIGS. 12 and 13).

Then, operation of the magnetic head arranged as such will be described when it is used to record and regenerate data or and from a magnetic medium such as a floppy disk. First, there will be described the case where data is recorded on the recording medium. A signal corresponding to data to be recorded is applied to the input/output ends (6a), (6b) of the read/write coil (6) while given voltage is applied to the input/output ends (12a), (12b) of the erasing coil (12). A current flowing through the read/write coil (6) based upon the signal causes a magnetic flux to appear across the read/write gap (3), whereby the write data (15) corresponding to the above signal is written on the recording medium while since a predetermined current has been conducted through the erasing coil (12) to cause a predetermined magnetic flux to appear across the erasing gap (9) and hence guard bands to be formed at opposite ends of the write data (15).

Alternatively, in the case where the write data (15) is regenerated (read out), without flowing the current to the erasing coil (12), as the magnetic head is driven to slide on the recording medium of the recording medium, a magnetic flux change in response to the write data (15) appears across the read/write gap (3) to conduct a current through the read/write coil (6). Thus, regenerated output voltage in response to the write data (13) appears at the input/outout ends (6a), (6b) of the read/write coil (6) for regeneration.

Moreover the resistor (22) prevents any surge from occuring on an erasing current waveform as an erasing current is driven by applying given DC voltage to the input/output ends (12a), (12b) of the erasing coil (12) for recording data on the recording medium, and hence any noise due to the surge is prevented from being recorded on the recording medium. In addition, the resistor (22) prevents resonance from being caused by the stray capacitance of the erasing coil (12) by permitting a current, which is to be driven by the electromagnetic energy stored in the erasing coil (12) at the instant when the erasing current is interrupted to flow when the recording onto the recording medium is stopped, to flow through the resistor (22) itself, and hence there is elminated occurence of any crosstalk along the read/write coil (6) which might be produced upon the erasing current being off.

Then operation of the crosstalk prevention means (23) when the write data (15) recorded on the recording medium is regenerated is as follows:

As the erasing gap (9) slides on the offset portion (19) when the tunnel erasing type magnetic head is used or on the write data (15) when the preceding erasing type magnetic head is used, as illustrated in FIG. 2(a), the magnetic flux $\phi$ across the erasing gap (9) is varied and goes to enter the magnetic circuit including the erasing core (7). Thereupon, a magnetic flux change is produced in the erasing coil (12) to produce electromotive force across the input/output ends (12a), (12b) of the erasing coil (12). The electromotive force is applied to opposite ends of the cross-talk prevention means (23), which means therefore acts to cause the erasing core (12) to generate a cancelling magnetic flux $\phi_c$ oppositely to the magnetic flux produced on the magnetic circuit including the erasing core (7). Hereby, the magnetic field which might cause crosstalk is prevented from flowing through the magnetic circuit including the erasing core (7). More specifically, crosstalk voltage $V_1$ induced across the input/output ends (12a), (12b) of the erasing coil (12) on the basis of the magnetic flux change subjected to the erasing gap (9) is expressed by the following equation (1):

$$V_1 = -N \cdot d\phi/dt \qquad (1)$$

Herein, $\phi$ is the magnetic flux and N is a winding number of the erasing coil.

Figure 2C:
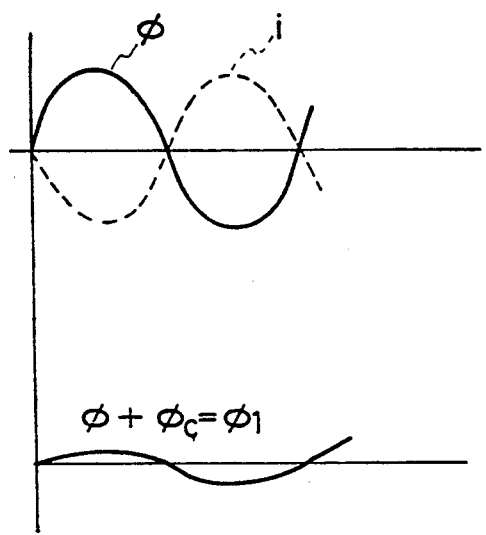
FIG. 2C is a graph illustrating the magnetic flux and current I generated by the erasing coil with respect to time, and the corresponding crosstalk magnetic flux that is produced.
Figure 2D:
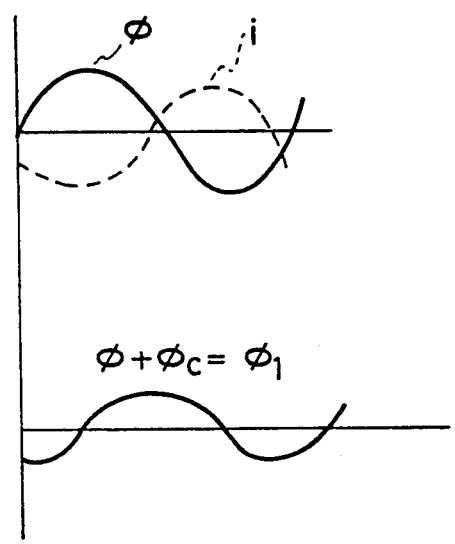
FIG. 2D is the graph of FIG. 2C for another embodiment of the invention.

Once the crosstalk voltage $V_1$ is produced, there is caused a current i depending on the circuit constants of a closed equivalent circuit formed of L2, C2, and R2 of the erasing coil (12), R3 of the resistor (22), and L4 of the crosstalk prevention means (23). The current i causes self-induction on the erasing coil (12) and hence a cancelling magnetic flux $\phi_c$ is generated along the magnetic circuit including the erasing core (7). Hereby, even though a magnetic flux is caused along the magnetic circuit including the erasing core (7) owing to the magnetic flux change subjected to the erasing gap (9), the aforementioned cancelling magnetic flux eliminates the ocurrence of the crosstalk magnetic flux along the magnetic circuit including the read/write core (1) from occurring. Accordingly, the regenerated signal yielded by the read/write coil (6) includes the crosstalk noise but assures high S/N ratio. In other words, the magnetic flux $\phi$ produces the current i, as illustrated in FIG. 2(a), which causes in turn the cancelling magnetic flux $\phi_c$ which cancels in turn the magnetic flux $\phi$ to reduce a crosstalk magnetic flux. Now, in a case where a resistor 23a of resistance $R_e$ is connected to inductance L4, if $R_e + R_2 = 0$, then $\phi$ and i are shifted $\pi$ in phases as illustrated in FIG. 2(C), so that the crosstalk magnetic flux $\phi_1$ can be reduced. If however, $R_e + R_2 \neq 0$, then they are not shifted $\pi$, so that the cancelling effect can not be enhanced. The crosstalk magnetic flux can therefore be reduced by reactance adjustment.

As described above, the first embodiment assures reduction of the crosstalk magnetic flux by adjusting the phase of the current i. As to the method to adjust the phase of the current i, there may be considered a method of connecting capacitance and adjusting the magnitude of the same which can belong to the scope of the present invention.

Figure 3:
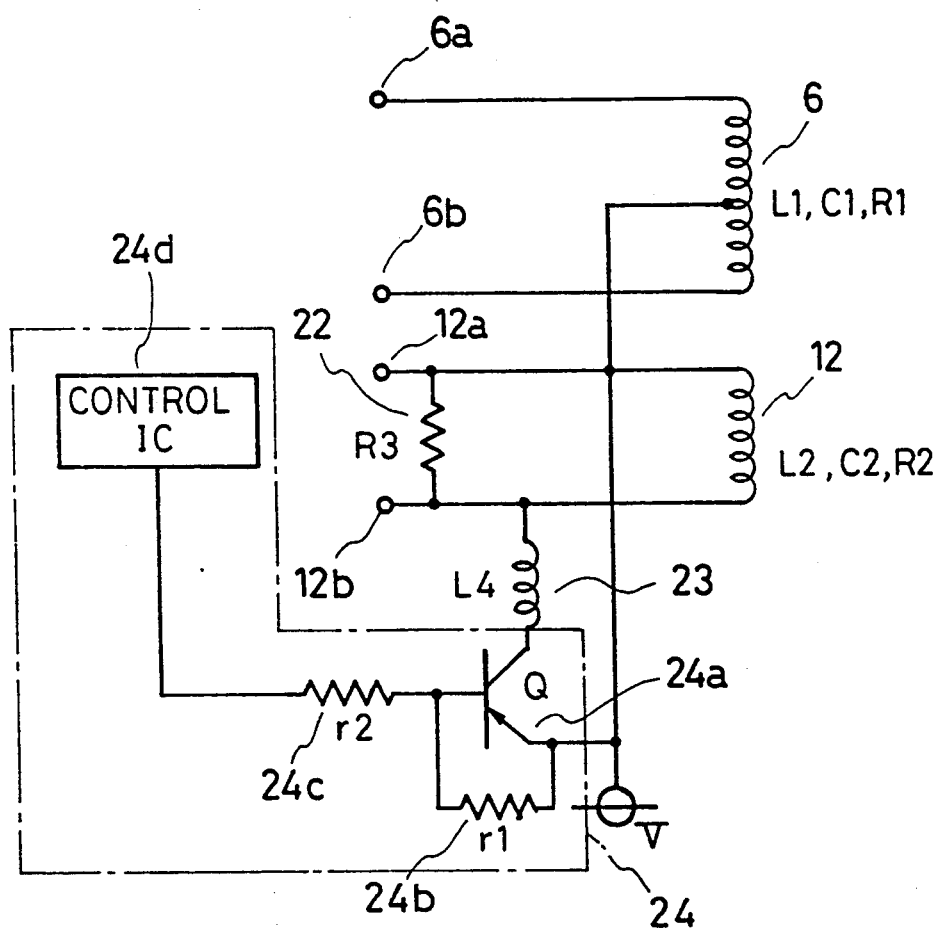
FIG. 3 is a schematic circuit diagram of another embodiment of the present invention employing a control circuit.

Referring to FIG. 3, a second embodiment of the present invention is illustrated. Differing from the case of FIG. 2, a control means (24) is additionally provided which connects the crosstalk prevention means (23) only during the regeneration operation or only when no erasing current flows through the erasing coil (12). The control means (24) comprises a transistor (24a) connected between the one end of the crosstalk prevention means (23) and a power supply potential point $V_1$, a resistor (24b) connected between the base and emitter of the transistor (24a), and a control section (24d) comprised of a read/write logic circuit formed of an IC connected to the base of the transistor (24a) through the resistor (24c) for controlling the transistor (24a) such that it is in a conduction state only during the regeneration.

The magnetic head arranged as such is operable likewise the magnetic head device illustrated in FIG. 2 in both cases of recording and regenerating data on and from the magnetic medium. Additionally, the magnetic head device has an effect that it does not affect the crosstalk prevention means upon writing data because the crosstalk prevention means (23) is separated from the erasing coil (12).

Figure 4:
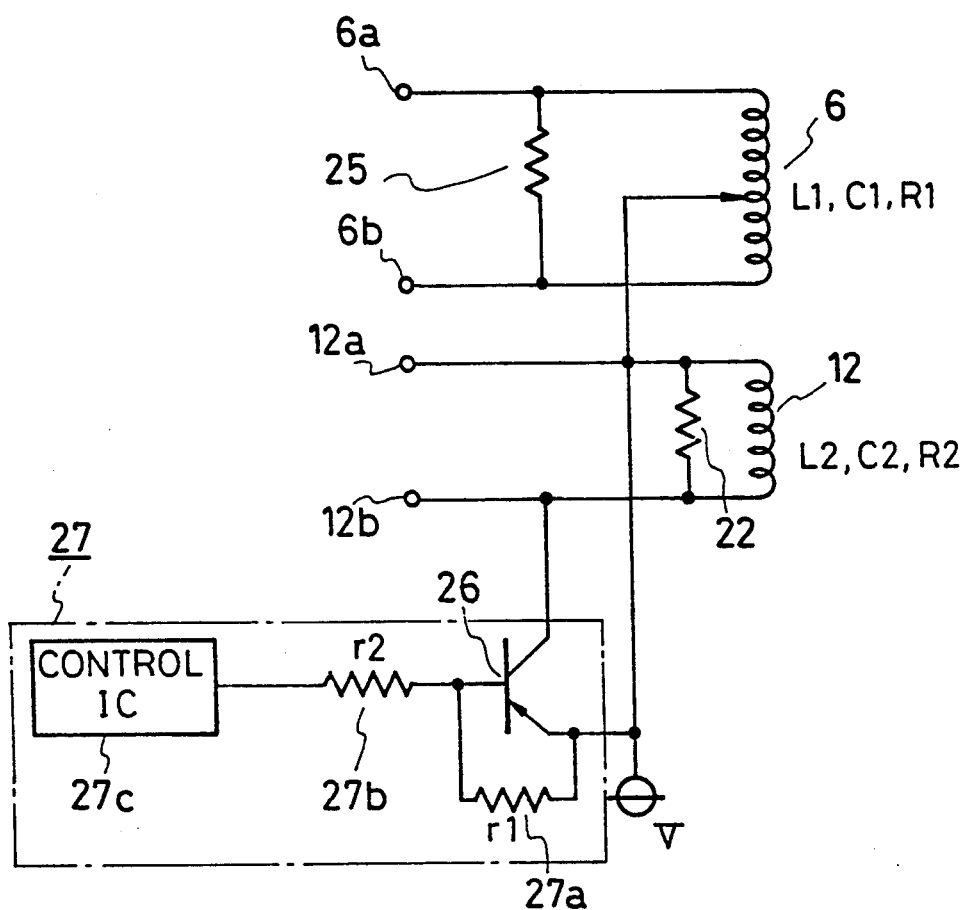
FIG. 4 is a schematic circuit diagram of another embodiment of the present invention employing a short circuiting device.

Referring now to FIG. 4, a third embodiment of the present invention is illustrated in the form of a wiring diagram of a read/write coil and an erasing coil. In the figure, numeral (25) designates a resistor connected to the input/output ends (6a), (6b) of the read/write coil (6) there across, (26) designates a short-circuit element such as an analog switch e.g., a transistor having a DC component internal resistor having lower resistance than the resistance R2 of the erasing coil (12). Herein, a diode is inadequate because it does not operate unless forward voltage is greater than 0.6 V. Numeral (27) designates erasing coil short-circuit means for switching the short-circuit element (26) on at regeneration, which comprises a resistor (27a) connected between the base and emitter of the transistor (26) connected between the one end of the erasing coil (12) and the power supply potential point V, and a control section (27c) composed of a read/write logic circuit formed of an IC connected to the base of the transistor (26) through a resistor (27b) for controlling the transistor (26) to a conduction state only during the regeneration.

In the following, operation will be described. In the case where data is recorded on the magnetic medium, the erasing coil short-circuit means (27) does not output a signal for short-circuitting the short-circuit element (26), so that the short-circuit element (26) remains opened. In this situation, the erasing gap (9) slides on the floppy disk preceding the read/write gap (3) and permits previously recorded data to be erased by an erasing signal from the erasing circuit (27), and a new signal is recorded on the floppy disk by the read/write gap (3). Upon the generation, the erasing coil short-circuit means (27) issues a short-circuit signal to cause the short-circuit element (26) to be switched on and the opposite ends (12a), (12b) of the erasing coil (12) to be short-circuitted. Accordingly, with the self-induction caused by the magnetic flux detected by the erasing gap (9) during the regeneration and passing through the erasing coil (12), back electromotive force is generated in a direction where a magnetic flux change is interrupted to produce a current, whereby an erasing regeneration magnetic flux passing through the erasing core (7) is cancelled out to reduce the erasing crosstalk to the read/write coil (6).

Although in the above embodiment there was principally described the magnetic head device used in a floppy disk drive device, the present invention is not limited thereto. Additionally, although there was described as the magnetic head general one of a bulk type in the tunnel type and the preceding erasing type, the magnetic head may also be applicable to a laminate type magnetic head including other tunnel erasing type and straddle erasing type.

Furthermore, although in the above embodiments there was described the magnetic head including the read/write core (1) and the erasing core (7) formed integrally, the present invention may be applicable to a non-integral structure and one including two recording-/regenerating magnetic heads. In this case, there can be prevented crosstalk between both magnetic heads.

According to the present invention including a magnetic head with a plurality of coils, as described above, there is provided crosstalk prevention means connected to at least one coil among the plurality of the coils of the magnetic head and having inductance, reactance, and capacitance components. Accordingly, a cancelling magnetic flux is formed which is directed oppositely to the crosstalk magnetic flux caused on the basis of the coil connected to the crosstalk prevention means, for preventing crosstalk noise from occurring upon regeneration of data recorded on a recording medium and for assuring a high S/N ratio regenerated output with a simple structure. Furthermore, there is provided the erasing coil short-circuit means which is to short-circuit the opposite ends of the erasing coil upon signal regeneration with a DC resistor of resistance less than that of the erasing coil. Accordingly, the crosstalk noise can sharply be reduced even without the non-magnetic layer in the center core to provide a simple construction magnetic head and hence an inexpensive floppy disk device.

What is claimed is:

1. A magnetic head device comprising:
    (a) a magnetic head including a core with a plurality of coils wound therearound, said core including means forming a plurality of gaps corresponding to the plurality of coils; and
    (b) crosstalk prevention means, comprising an inductance and a resistance both connected electrically in parallel with at least one of the coils of said magnetic head for generating a cancelling magnetic flux in response to a crosstalk magnetic flux in the coil with which the means is connected in parallel, to cancel the crosstalk magnetic flux and to prevent crosstalk.

2. A magnetic head device according to claim 1 wherein one of the coils is a read/write coil for recording and regenerating data and one of the coils is an erasing coil for erasing data, and wherein said crosstalk prevention means is connected electrically in parallel to said erasing coil.

3. A magnetic head device according to claim 1 further comprising control means for connecting said crosstalk prevention means to said erasing coil only when the read-write coil is regenerating data.

4. The magnetic head device of claim 3, wherein the control means comprises:
    a transistor having its collector connected to an end of the crosstalk prevention means, a resistor connected between the base and the emitter of the transistor, and a read/write logic circuit connected to the base of the transistor for controlling the transistor such that it conducts only when the read/write coil is regenerating data.

5. The magnetic head device of claim 4, wherein the read/write logic circuit comprises an integrated circuit.

6. A magnetic head device comprising:

a read/write core with a read/write coil wound therearound for at least regenerating data, an erasing core with an erasing coil wound therearound and having a DC resistance between first and second ends, means forming a read/write gap and an erasing gap between the read/write and erasing cores, and erasing coil short-circuit means for short-circuitting the ends of the erasing coil and having a DC resistance less than the DC resistance of the erasing coil when the read/write coil is regenerating data.

7. The magnetic head device of claim 6, wherein the short circuit means comprises:

a transistor having its collector connected to the first end of the erasing coil and its emitter connected to the second end of the erasing coil;

a resistor connected between the base and the emitter of the transistor, and a read/write logic circuit connected to the base of the transistor for controlling the transistor such that it conducts only when the read/write coil is regenerating data.

8. The magnetic head device of claim 1, wherein the read/write logic circuit comprises an integrated circuit.

9. A magnetic head device comprising:

(a) a magnetic head including a core with a plurality of coils wound therearound, said core including means forming a plurality of gaps corresponding to the plurality of coils; and (b) crosstalk prevention means, comprising a capacitance and a resistance both connected electrically in parallel with at least one of the coils of said magnetic head for generating a cancelling magnetic flux in response to a crosstalk magnetic flux in the coil with which the means is connected in parallel, to cancel the crosstalk magnetic flux and to prevent crosstalk.

10. A magnetic head device according to claim 9 wherein one of the coils is a read/write coil for recording and regenerating data and one of the coils is an erasing coil for erasing data, and wherein said crosstalk prevention means is connected electrically in parallel to said erasing coil.

11. A magnetic head device according to claim 9 further comprising control means for connecting said crosstalk prevention means to said erasing coil only when the read/write coil is regenerating data.

12. The magnetic head device of claim 11, wherein the control means comprises:

a transistor having its collector connected to an end of the crosstalk prevention means, a resistor connected between the base and the emitter of the transistor, and a read/write logic circuit connected to the base of the transistor for controlling the transistor such that it conducts only when the read/write coil is regenerating data.

13. The magnetic head device of claim 12, wherein the read/write logic circuit comprises an integrated circuit.

* * * * *